(12) United States Patent
Vannan

(10) Patent No.: US 7,635,444 B2
(45) Date of Patent: Dec. 22, 2009

(54) METHOD OF MOLDING A TIRE

(76) Inventor: Frederick Forbes Vannan, 8509 Foxglove Ave. NW., Clinton, OH (US) 44216

(*) Notice: Subject to any disclaimer, the term of this patent is extended or adjusted under 35 U.S.C. 154(b) by 926 days.

(21) Appl. No.: 11/057,684

(22) Filed: Feb. 11, 2005

(65) Prior Publication Data

US 2006/0182829 A1   Aug. 17, 2006

(51) Int. Cl.
*B29C 45/14* (2006.01)
(52) U.S. Cl. ........................ 264/257; 264/261; 264/262; 264/275; 264/277
(58) Field of Classification Search ........................ None
See application file for complete search history.

(56) References Cited

U.S. PATENT DOCUMENTS

| | | | | | |
|---|---|---|---|---|---|
| 3,458,373 | A | * | 7/1969 | Weinbrenner et al. | 156/125 |
| 4,055,619 | A | * | 10/1977 | Goodfellow | 264/258 |
| 4,277,295 | A | * | 7/1981 | Schmidt et al. | 156/117 |
| 4,305,446 | A | * | 12/1981 | Brown et al. | 152/452 |
| 6,971,426 | B1 | * | 12/2005 | Steinke | 152/452 |

* cited by examiner

*Primary Examiner*—Edmund H. Lee

(57) ABSTRACT

This invention provides a method to hold tire reinforcements such as plies, belts and beads in place within a tire molding cavity while liquid elastomer surrounds the reinforcements, fills the tire mold and solidifies.

2 Claims, 5 Drawing Sheets

METHOD OF MOLDING A TIRE

U.S. PATENT REFERENCES

Application Ser. No. 10/674,989 filed Sep. 30, 2003— titled Reinforced Liquid Elastomer Tire Manufacturing Method and Apparatus for Manufacture, Frederick F. Vannan

BACKGROUND

A tire utilizes reinforcement components such as plies, belts, and beads to control tire size and shape and to hold it on a wheel. Traditional rubber tires are assembled on a building drum by laminating strips of rubber and rubber coated reinforcement. The rubber coating on the reinforcements is solid and sticky and un-vulcanized which allows it to control distance between reinforcements and to hold reinforcements in place until the vulcanization reaction can be completed.

Conventional rubber tires have manufacturing and performance problems associated with laminating one green and un-vulcanized component on top of another. The biggest problem is air entrapped between laminates and at ends of laminates. This entrapped air can cause a manufacturing defect in the cured, vulcanized, tire called a "blow", which is an air bubble entrapped within the cured tire. A small blow which is not caught during tire inspection can become larger during service allowing structural components to separate and generate heat from friction between the separated components. This separation and heat can cause tire failure which is sometimes catastrophic.

The liquid elastomer tires of this invention are not assembled by laminating one elastomeric strip upon another. Instead, the tires of this invention have their reinforcements— plies, belts and beads—assembled and liquid elastomer poured or injected around them. There is no entrapped air within the finished tire structure and, therefore, no blows or separations in service.

SUMMARY OF INVENTION

This invention provides a method to hold tire reinforcements in place within a tire mold cavity while liquid elastomer fills the mold cavity and solidifies.

This method utilizes at least partially solidified elastomer to hold ply and belt cords or cables together at specified angles during the tire assembly and elastomer molding processes. At least partially solidified elastomer is also used to position reinforcing components one to another and relative to the mold and internal core while the liquid elastomer fills the mold and solidifies.

The, at least partially solidified, elastomeric spacers have a high degree of adhesion to the reinforcements and to the liquid elastomer around them. The elastomeric spacers support the ply and control the distance between the ply and core and other plies and ply endings.

The elastomeric spacers support each belt and control the distance between first belt and ply and between belts.

The elastomeric spacers support each bead and control the distance between the beads and ply. These spacers also position the beads relative to the mold and core.

The elastomeric spacers support the overlay and control the distance between the overlay and top belt.

FIG. 1 shows a cross-section of a liquid elastomer tire.

FIG. 2 shows the cylindrical array of ply cords passing through a segmented mold.

FIG. 2b shows a completed ply band.

FIG. 3 shows a helical array of belt cords passing through a segmented mold.

FIG. 3b shows a completed belt band.

Figure 1:
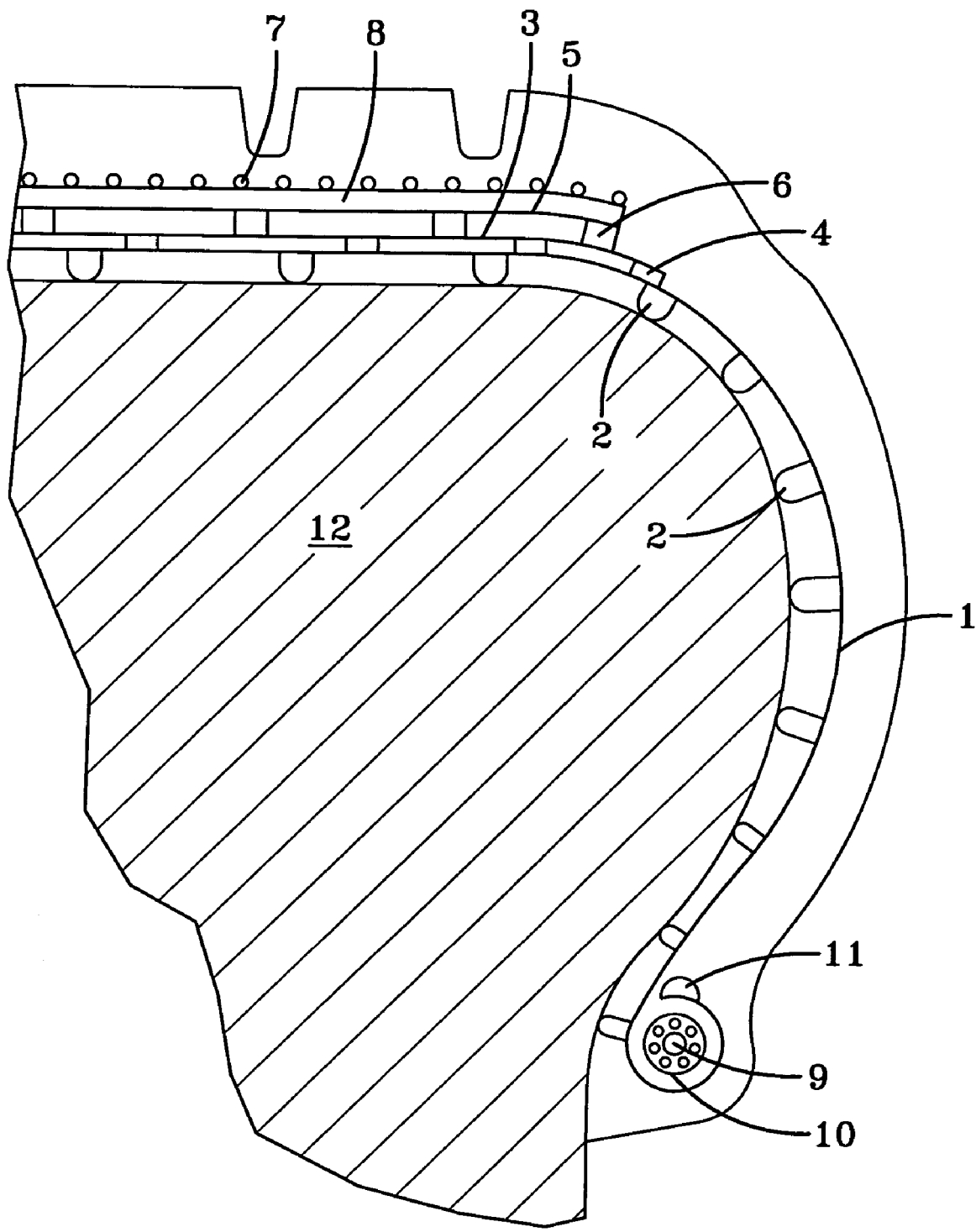
FIG. 1 shows a cross-section of a liquid elastomer tire having beads 9, ply 1, belts 3 and 5 and overlay 7 as reinforcing components. The reinforcing components are held precisely in their specified positions during tire assembly and molding by at least partially solidified elastomeric spacers.

Elastomeric spacers 2 are attached to ply 1 and support it on core 12. Elastomeric spacers 4 support the first belt 3 and control spacing between belt 3 and ply 1. Elastomeric spacers 6 support the second belt 5 and control spacing between belt 5 and belt 3. Elastomeric spacers 8 support overlay 7 and control spacing between 7 and belt 5.

The beads 9 in FIG. 1 are encapsulated with at least partially solidified elastomer 10 which controls the spacing between the beads 9 and ply 1. The solidified elastomer 11 attached to the ply ending locks the ply ending around the bead 9. This ply ending elastomer can have different shapes including a wider circumferential strip which permits a higher ply 1 ending.

Figure 2:
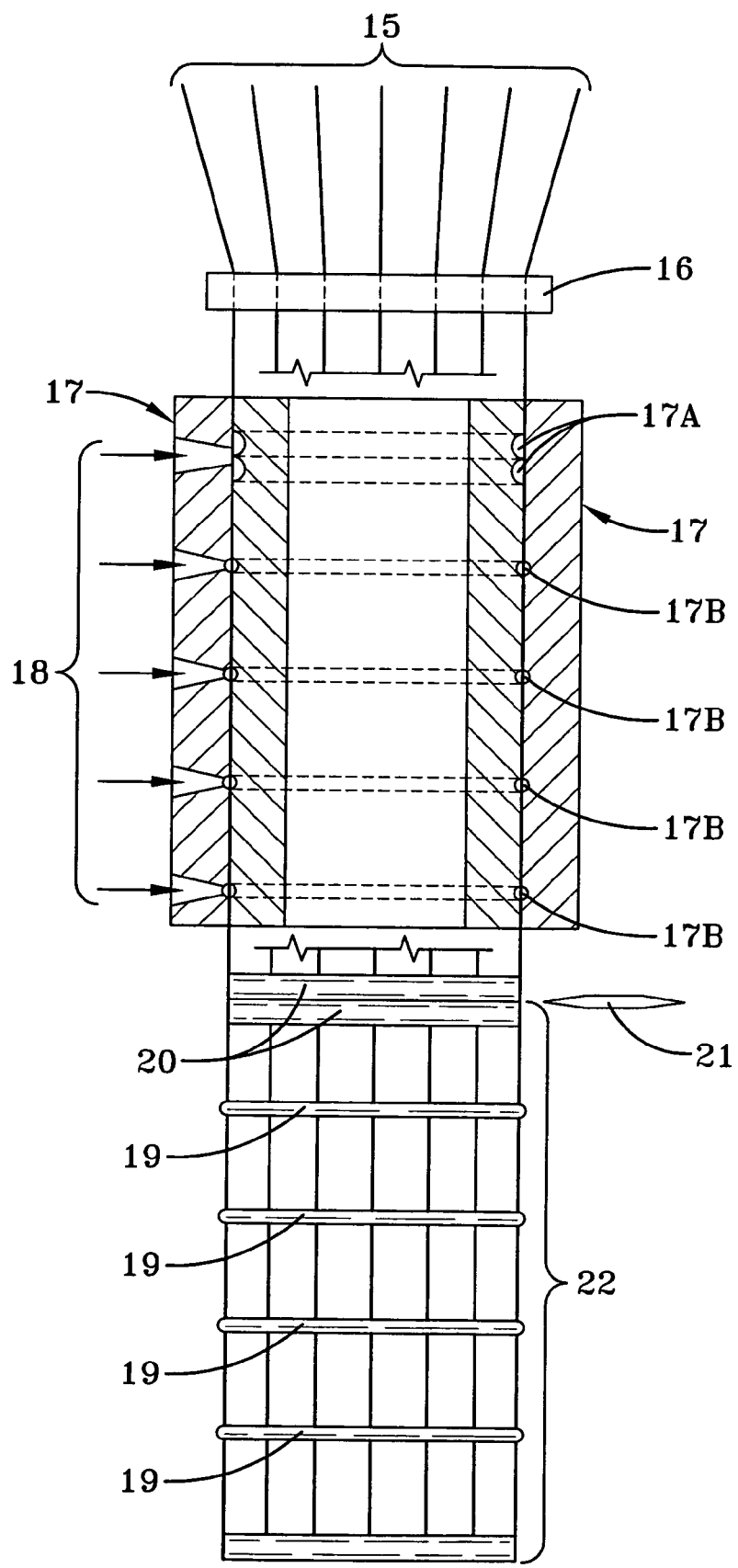

FIG. 2 shows a method of making ply reinforcement for a tire. This method utilizes at least partially solidified elastomer to hold ply cords in place during tire assembly and subsequent filling of the tire mold cavity with liquid elastomer.

Individual ply cords 15, in FIG. 2, are organized in a cylindrical array most preferably at approximately the bead diameter by a cylindrical organizing die 16.

FIG. 2 also shows the cylindrical array of ply cords passing through a segmented mold 17 and elastomer 18 filling the mold 17 and at least partially solidifying around the ply cords holding them in place. Part of the segmented mold 17A forms the ply ending elastomer 20. Other parts of the segmented mold 17B form circumferential rings of elastomer 19 which hold the ply cords 15 in place during tire assembly and subsequent filling of the tire mold cavity with liquid elastomer.

Figure 2B:
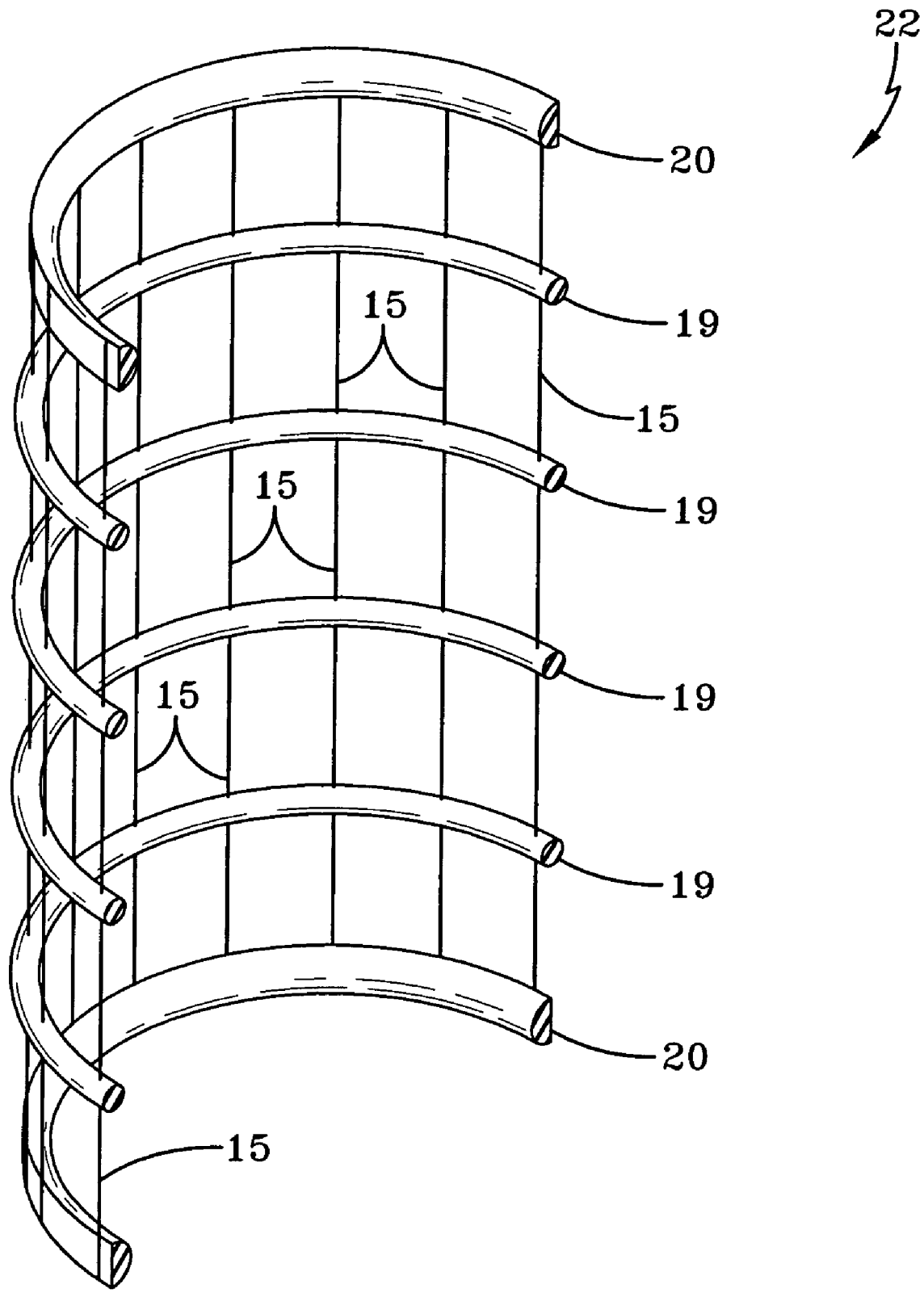

A circumferential cutter 21 in FIG. 2 then separates the completed ply band 22, also shown in FIG. 2B, from the following ply band. The individual ply cords 15 in the completed ply band 22 are held in place by at least partially solidified elastomeric rings 19 and 20. The ply band 22, in FIG. 2B, is now ready for tire assembly.

Figure 3:
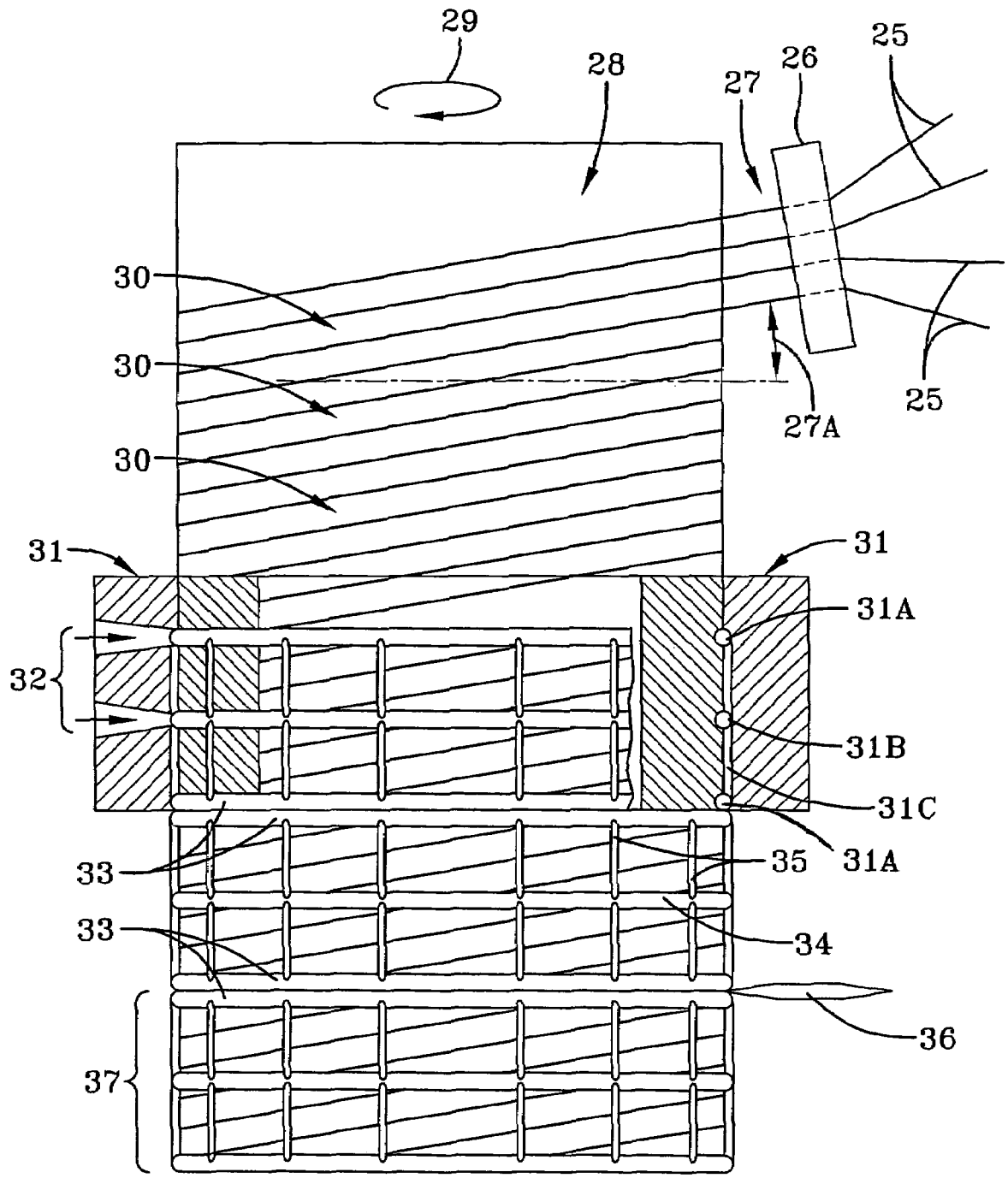

FIG. 3 shows a method of making a belt reinforcement for a tire. This method utilizes at least partially solidified elastomer to hold belt cords or cables in place during tire assembly and subsequent filling of the tire mold cavity with liquid elastomer.

Individual belt cords 25, in FIG. 3, are organized into a flat strip 27 by organizing die 26 and applied to the round, rotating mandrel 28. The direction of rotation 29 pulls the strip of belt cords 27 onto the mandrel 28. The diameter of the mandrel 28 is approximately the diameter of the finished belt. The angle of application 27A of the belt cord strip 27 to the rotating mandrel 28 determines the completed belt 37 cord angle. Belt cord strips 27 are wound onto the rotating mandrel 28 forming a continuous helical array of belt cords 30 which has the appearance of a barber pole.

FIG. 3 also shows the helical array of belt cords 30 passing through a segmented mold 31 and elastomer 32 filling the mold 31 and at least partially solidifying around the belt cords holding them in place. Part of the segmented mold 31A forms the belt edge elastomeric rings 33. Part of the segmented mold 31B forms circumferential support rings of elastomer 34 which hold the belt cords 25 in place during tire assembly and molding. FIG. 3 shows only one circumferential support ring 34 for drawing simplification purposes, but multiple support rings 34 will be utilized in this invention. Part of segmented mold 31C forms vertical ridges of elastomer 35 which will support and space the overlay 7 in FIG. 1 above top belt 5. These vertical ridges 35 in FIG. 3 are shown in cross section in FIG. 1 as item 8.

Figure 3B:
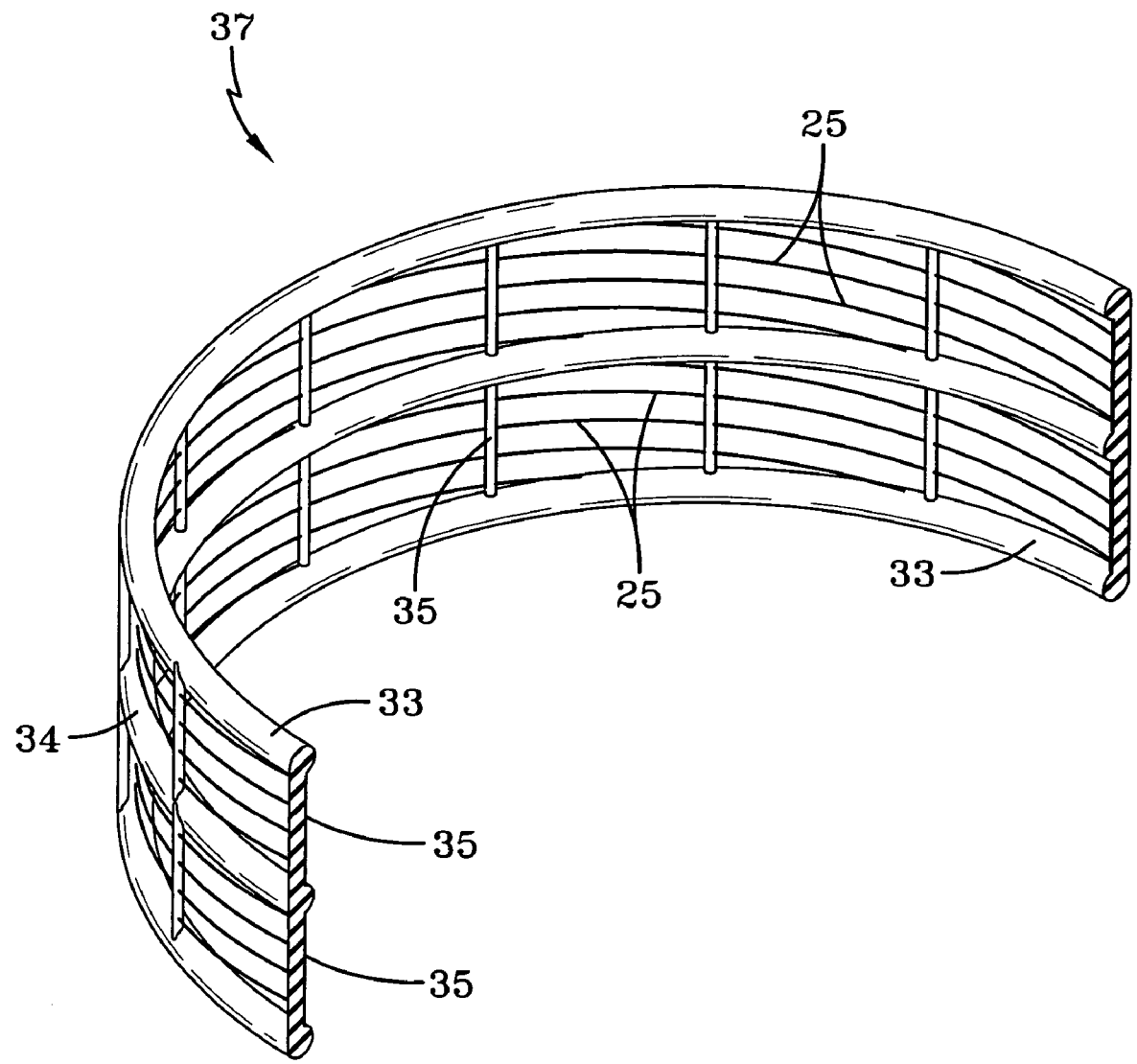

A circumferential cutter 36 in FIG. 3 separates the completed belt band 37 from the following belt band. The individual belt cords or cables 25 in the completed belt band 37, shown in FIG. 3B, are held in place by at least partially solidified elastomeric rings 33 and 34 which also space the belt band 37 from the ply and other belts. Both belts will utilize elastomeric rings 33 and 34 but only the top belt, item 5 in FIG. 1, will require vertical ridges 35 in FIG. 3 and FIG. 3B and item 8 in FIG. 1 to space the overlay 7 in FIG. 1 from top belt 5. The completed belt bands 37 are now ready for tire assembly.

The sizes, shapes and numbers of elastomeric spacers and supports utilized in the ply band 22 in FIG. 2B and in the belt bands 37 will vary for different sizes and types of tires.

The invention claimed is:

1. Method of molding a tire, the method comprising: providing reinforcements of plies having endings, belt cords or cables, and beads, wherein the reinforcements having multiple at least partially solidified elastomer spacers attached thereto; providing beads that are encapsulated with at least partially solidified elastomer, wherein the ply endings are locked around the beads by another at least partially solidified elastomer spacer; assembling the reinforcements and the encapsulated beads in a mold cavity of an injection mold, the mold cavity has the shape of an entire tire, wherein the spacers position the reinforcements relative to one another, and the mold cavity surfaces in order to control the distances there between; and injecting an elastomer into the mold cavity to form the tire, wherein the injected elastomer surrounds the reinforcements, the at least partially solidified elastomer spacers, and the encapsulated beads, and the injected elastomer subsequently solidifies completing a reinforced tire ready for service.

2. The method of claim 1, wherein the elastomer spacers and the injected elastomer are polyurethane.

* * * * *